W. H. BOUTELL.
CLUTCH.
APPLICATION FILED AUG. 9, 1909.
953,118.
Patented Mar. 29, 1910.
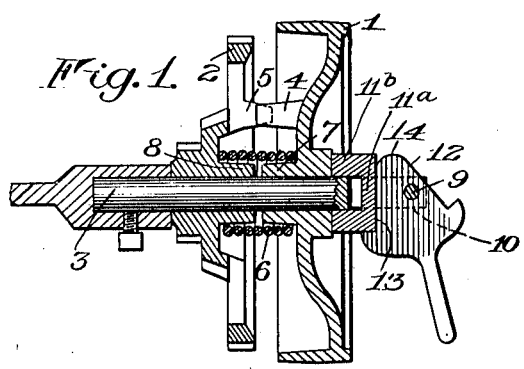
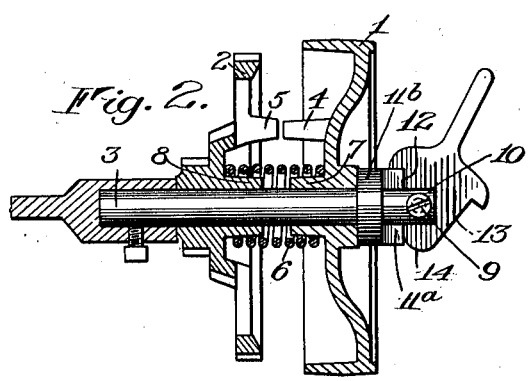
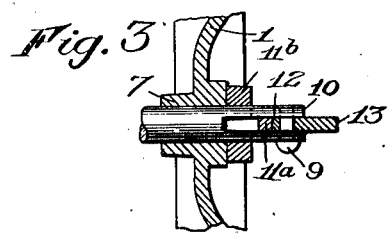
Witnesses
Walter B. Payne.
H. H. Simms
Inventor
William H Boutell
By Church & Rich
his Attorneys

UNITED STATES PATENT OFFICE.

WILLIAM H. BOUTELL, OF ROCHESTER, NEW YORK, ASSIGNOR TO BOUTELL MANUFACTURING COMPANY, OF ROCHESTER, NEW YORK, A CORPORATION OF NEW YORK.

CLUTCH.

953,118.  Specification of Letters Patent.  Patented Mar. 29, 1910.

Original application filed September 23, 1905, Serial No. 279,752. Divided and this application filed August 9, 1909. Serial No. 511,920.

*To all whom it may concern:*

Be it known that I, WILLIAM H. BOUTELL, of Rochester, in the county of Monroe and State of New York, have invented certain new and useful Improvements in Clutches; and I do hereby declare the following to be a full, clear, and exact description of the same, reference being had to the accompanying drawings, forming a part of this specification, and to the reference-numerals marked thereon.

The present invention relates to clutches and this application is a division of an application filed by me on the 23rd of September, 1905, Serial No. 279,752, for fruit paring machines.

The object of the present invention is to provide a clutch which is inexpensive to manufacture, simple to operate and not liable to move accidentally to clutching or unclutching positions.

To these and other ends the invention consists in certain improvements and combinations of parts all as will be hereinafter more fully described, the novel features being pointed out in the claims at the end of the specification.

In the drawings: Figure 1 is a sectional view showing the clutch in clutching position; Fig. 2 is a like view showing the clutch in unclutching position; and Fig. 3 is a detail view of the clutch operating means.

Referring more particularly to the drawings, 1 indicates a driving member and 2 a driven member. Preferably these members are mounted to turn loosely on a rigidly secured spindle or bearing 3 and one of them is movable axially toward and from the other to effect the clutching action, their opposed faces being provided with clutching portions, which in this instance are in the form of projections 4 and 5, said projections being of such a length that a movement of the movable member toward and from the other in the direction of its axis is permitted during the clutching action.

In the illustrated embodiment the movable member is the driving member 1 which may be separated from the driven member 2 by a helically coiled spring 6, the latter preferably seating at its ends against the members 1 and 2 and surrounding annular bosses 7 and 8 on said members.

The relative movement between the driving member and the driven member may be effected by a cam which has a releasing portion permitting the unclutching of the members, a compression portion effecting the movement of the driving member toward the driven member, and a locking portion which holds the driving member in clutching position. In this instance the cam is pivoted at 9 within the bifurcated end 10 of the bearing 3 and coöperates with a portion 11ª of a follower, said portion operating within the bifurcated end of the bearing and being connected to a ring portion 11ᵇ which surrounds the bearing and engages the driving member. This form of the cam has a flat face 12 forming the releasing portion, and a flat face 13 forming a locking portion, and arranged at an angle to face 12 at a greater distance from the pivot 9 than said face 12, a curved nose 14 connecting the faces 12 and 13 at a distance from the pivot 9 greater than the face 13 and serving as the portion which compresses the spring 6 and moves member 1 into clutching relation with member 2.

It will be seen that in effecting the clutching action the compression portion of the cam carries the driving member slightly beyond the position at which it is held by the locking portion so that when the latter is reached the spring expands and holds the cam against accidental displacement. The construction illustrated for accomplishing this result is inexpensive to manufacture and the operation and construction of its parts are simple.

I claim as my invention:

1. In a clutch, the combination with a driving member and a driven member having clutching portions permitting relative movement in the direction of the turning axis of the clutch during clutching, and one of said members being movable relatively to the other to cause the clutching portions to engage, of a spring arranged to separate the clutching portions, and a cam coöperating with the movable member and having a compression portion arranged to compress the spring and a locking portion for holding the members in clutching position so arranged relatively to the compression portion that the spring is permitted to expand slightly to hold the cam against accidental displacement.

2. In a clutch, the combination with a driving member and a driven member having clutching portions permitting relative movement in the direction of the turning axis of the clutch during clutching, and one of said members being movable relatively to the other to cause the clutching portions to engage, of a spring arranged to separate the clutching portions, and a pivotally mounted cam having a locking portion, and a compression portion located at a greater distance from said pivot than the locking portion.

3. In a clutch, the combination with a bearing and a driving and a driven member turning thereon, said members having clutching portions permitting relative movement between the members in the direction of the turning axis of the clutch during clutching and one of said members being movable axially to effect the clutching, of a spring arranged to separate the driving and the driven member, a cam pivotally mounted on the bearing and having a releasing portion, a locking portion located at a greater distance from the pivot of the cam than the releasing portion, and a compression portion located at a greater distance from the pivot than the locking portion.

4. The combination with a bearing bifurcated at one end, of a driving and a driven member adapted to turn on the bearing, one of said members being movable relatively to the other to effect the clutching, a follower surrounding the bearing, coöperating with the movable member and having a portion operating in the bifurcated end of the bearing, and a cam pivotally mounted in the bifurcated end of the bearing and coöperating with the follower to move the latter.

5. The combination with the stationary shaft having the bifurcated end and clutch members rotatable on the shaft and relatively movable longitudinally thereof, and a spring for causing their relative movement to separate them, of a cam pivoted in the bifurcated end of the shaft having a body portion and a compression portion, the latter being farther removed from the pivot than the other.

W. H. BOUTELL.

Witnesses:
RUSSELL B. GRIFFITH,
HAROLD H. SIMMS.